United States Patent
Li

(10) Patent No.: US 11,074,124 B2
(45) Date of Patent: Jul. 27, 2021

(54) METHOD AND SYSTEM FOR ENHANCING THROUGHPUT OF BIG DATA ANALYSIS IN A NAND-BASED READ SOURCE STORAGE

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 2 days.

(21) Appl. No.: 16/519,972

(22) Filed: Jul. 23, 2019

(65) Prior Publication Data

US 2021/0026731 A1 Jan. 28, 2021

(51) Int. Cl.
*G06F 11/10* (2006.01)
*H04L 29/08* (2006.01)
*G06F 3/06* (2006.01)

(52) U.S. Cl.
CPC .......... *G06F 11/1008* (2013.01); *G06F 3/067* (2013.01); *G06F 3/0619* (2013.01); *G06F 3/0655* (2013.01); *H04L 67/1097* (2013.01)

(58) Field of Classification Search
CPC ............. G06F 11/1004; G06F 11/1008; G06F 11/1044; G06F 3/0619; G06F 3/067; G06F 3/0655; H04L 67/1095; H04L 67/1097

See application file for complete search history.

(56) References Cited

U.S. PATENT DOCUMENTS

| | | |
|---|---|---|
| 3,893,071 A | 7/1975 | Bossen |
| 4,718,067 A | 1/1988 | Peters |
| 5,394,382 A | 2/1995 | Hu |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,457,104 B1 | 9/2002 | Tremaine |
| 6,658,478 B1 | 12/2003 | Singhal |
| 7,351,072 B2 | 4/2008 | Muff |
| 7,599,139 B1 | 10/2009 | Bombet |
| 7,953,899 B1 | 5/2011 | Hooper |

(Continued)

FOREIGN PATENT DOCUMENTS

WO 9418634 8/1994

OTHER PUBLICATIONS

Tsuchiya, Yoshihiro et al. "DBLK: Deduplication for Primary Block Storage", MSST 2011, Denver, CO, May 23-27, 2011 pp. 1-5.

(Continued)

*Primary Examiner* — Shelly A Chase
(74) *Attorney, Agent, or Firm* — Shun Yao; Park, Vaughan, Fleming & Dowler LLP

(57) ABSTRACT

One embodiment facilitates data access in a storage device. During operation, the system obtains, by the storage device, a file from an original physical media separate from the storage device, wherein the file comprises compressed data which has been previously encoded based on an error correction code (ECC). The system stores, on a physical media of the storage device, the obtained file as a read-only replica. In response to receiving a request to read the file, the system decodes, by the storage device based on the ECC, the replica to obtain ECC-decoded data, wherein the ECC-decoded data is subsequently decompressed by a computing device associated with the storage device and returned as the requested file.

18 Claims, 10 Drawing Sheets

(56) References Cited

U.S. PATENT DOCUMENTS

| | | |
|---|---|---|
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,281,061 B2 | 10/2012 | Radke |
| 8,751,763 B1 | 6/2014 | Ramarao |
| 8,825,937 B2 | 9/2014 | Atkisson |
| 8,868,825 B1 | 10/2014 | Hayes |
| 8,904,061 B1 | 12/2014 | O'Brien, III |
| 9,015,561 B1 | 4/2015 | Hu |
| 9,129,628 B1 | 9/2015 | Fallone |
| 9,280,472 B1 | 3/2016 | Dang |
| 9,280,487 B2 | 3/2016 | Candelaria |
| 9,336,340 B1 | 5/2016 | Dong |
| 9,436,595 B1 | 9/2016 | Benitez |
| 9,529,601 B1 | 12/2016 | Dharmadhikari |
| 9,747,202 B1 | 8/2017 | Shaharabany |
| 9,852,076 B1 | 12/2017 | Garg |
| 9,875,053 B2 | 1/2018 | Frid |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 | 6/2019 | Barzik |
| 10,437,670 B1 | 10/2019 | Koltsidas |
| 10,649,657 B2 | 5/2020 | Zaidman |
| 2001/0032324 A1 | 10/2001 | Slaughter |
| 2002/0095403 A1 | 7/2002 | Chandrasekaran |
| 2003/0145274 A1 | 7/2003 | Hwang |
| 2003/0217080 A1 | 11/2003 | White |
| 2004/0066741 A1 | 4/2004 | Dinker |
| 2004/0103238 A1 | 5/2004 | Avraham |
| 2005/0177672 A1 | 8/2005 | Rao |
| 2005/0235067 A1 | 10/2005 | Creta |
| 2006/0031709 A1 | 2/2006 | Hiraiwa |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0089544 A1 | 4/2009 | Liu |
| 2009/0287956 A1 | 11/2009 | Flynn |
| 2009/0310412 A1 | 12/2009 | Jang |
| 2010/0169470 A1 | 7/2010 | Takashige |
| 2010/0217952 A1 | 8/2010 | Iyer |
| 2010/0332922 A1 | 12/2010 | Chang |
| 2011/0055471 A1 | 3/2011 | Thatcher |
| 2011/0099418 A1 | 4/2011 | Chen |
| 2011/0161784 A1 | 6/2011 | Selinger |
| 2011/0191525 A1 | 8/2011 | Hsu |
| 2011/0258514 A1 | 10/2011 | Lasser |
| 2011/0299317 A1 | 12/2011 | Shaeffer |
| 2012/0089774 A1 | 4/2012 | Kelkar |
| 2012/0096330 A1 | 4/2012 | Przybylski |
| 2012/0147021 A1 | 6/2012 | Cheng |
| 2012/0159099 A1 | 6/2012 | Lindamood |
| 2012/0173792 A1 | 7/2012 | Lassa |
| 2012/0278579 A1 | 11/2012 | Goss |
| 2013/0054822 A1 | 2/2013 | Mordani |
| 2013/0061029 A1 | 3/2013 | Huff |
| 2013/0080391 A1 | 3/2013 | Raichstein |
| 2013/0151759 A1 | 6/2013 | Shim |
| 2013/0191601 A1 | 7/2013 | Peterson |
| 2013/0238955 A1 | 9/2013 | D Abreu |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0181532 A1 | 6/2014 | Camp |
| 2014/0195564 A1 | 7/2014 | Talagala |
| 2014/0279927 A1 | 9/2014 | Constantinescu |
| 2014/0304452 A1 | 10/2014 | De La Iglesia |
| 2015/0121031 A1 | 4/2015 | Feng |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077968 A1 | 3/2016 | Sela |
| 2016/0098350 A1 | 4/2016 | Tang |
| 2016/0154601 A1 | 6/2016 | Chen |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0274636 A1 | 9/2016 | Kim |
| 2016/0306853 A1 | 10/2016 | Sabaa |
| 2016/0342345 A1 | 11/2016 | Kankani |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0147499 A1 | 5/2017 | Mohan |
| 2017/0161202 A1 | 6/2017 | Erez |
| 2017/0177217 A1 | 6/2017 | Kanno |
| 2017/0177259 A1 | 6/2017 | Motwani |
| 2017/0220254 A1 | 8/2017 | Warfield |
| 2017/0221519 A1 | 8/2017 | Matsuo |
| 2017/0249162 A1 | 8/2017 | Tsirkin |
| 2017/0262217 A1 | 9/2017 | Pradhan |
| 2017/0279460 A1* | 9/2017 | Camp ............... H03M 7/4081 |
| 2017/0285976 A1 | 10/2017 | Durham |
| 2017/0344491 A1 | 11/2017 | Pandurangan |
| 2018/0024779 A1 | 1/2018 | Kojima |
| 2018/0033491 A1 | 2/2018 | Marelli |
| 2018/0052797 A1 | 2/2018 | Barzik |
| 2018/0074730 A1* | 3/2018 | Inoue ................. G06F 3/0616 |
| 2018/0076828 A1* | 3/2018 | Kanno ................. G11C 16/10 |
| 2018/0107591 A1 | 4/2018 | Smith |
| 2018/0143780 A1 | 5/2018 | Cho |
| 2018/0165038 A1* | 6/2018 | Authement .......... G06F 3/0688 |
| 2018/0167268 A1 | 6/2018 | Liguori |
| 2018/0173620 A1 | 6/2018 | Cen |
| 2018/0212951 A1 | 7/2018 | Goodrum |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0087115 A1 | 3/2019 | Li |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0097189 A1 | 3/2020 | Tao |

OTHER PUBLICATIONS

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

(56) References Cited

OTHER PUBLICATIONS

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.
WOW: Wise Ordering for Writes—Combining Spatial and Temporal Locality in Non-Volatile Caches by Gill (Year: 2005).
Helen H. W. Chan et al. "HashKV: Enabling Efficient Updated in KV Storage via Hashing", https://www.usenix.org/conference/atc18/presentation/chan, (Year: 2018).
S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.
Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.
Jimenex, X., Novo, D. and P. Ienne, "Pheonix:Reviving MLC Blocks as SLC to Extend NAND Flash Devices Lifetime, "Design, Automation & Text in Europe Conference & Exhibition (Date), 2013.
Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

\* cited by examiner

METHOD AND SYSTEM FOR ENHANCING THROUGHPUT OF BIG DATA ANALYSIS IN A NAND-BASED READ SOURCE STORAGE

BACKGROUND

Field

This disclosure is generally related to the field of data storage. More specifically, this disclosure is related to a method and system for enhancing the throughput of big data analysis in a NAND-based read source storage.

Related Art

The proliferation of the Internet and e-commerce continues to create a vast amount of digital content. Various distributed storage systems have been created to access and store such digital content. In some read-intensive scenarios, a storage system may store the original version of data, where the stored original data is frequently read or accessed, but not necessarily updated. One example of a read-intensive scenario is "big data" analysis, which involves examining large and varied data sets (i.e., big data) to identify relevant information, such as hidden patterns, market trends, unknown correlations, and any information which may be relevant to a user. Big data analysis requires reading a very large amount of data frequently, but leaving the source data unchanged. To accelerate the data analysis processing performed by multiple data analysis servers, the intermediate results are generally stored in a memory-style medium. However, this may result in a considerable overhead in transferring a large amount of data through the Ethernet over a long distance. To avoid this overhead, the read source is generally replicated to form a local copy at each site. As a result, both a low cost and a high throughput are practical and essential requirements for storage of source data replicas.

In current big data analysis, conventional distributed storage systems can be used to provide the required storage for the multiple stored replicas of the original data source. However, the use of conventional distributed storage systems can result in several challenges and inefficiencies, including: a costly deployment of an entire distributed storage system consisting of tens of computing servers and storage servers, including networking; expensive rack space in a data center; a high power cost; and a high latency to access replicas stored in the storage servers.

As big data analysis continues to grow, the inefficiencies and challenges of conventional distributed storage systems will also continue to grow.

SUMMARY

One embodiment facilitates data access in a storage device. During operation, the system obtains, by the storage device, a file from an original physical media separate from the storage device, wherein the file comprises compressed error-free data which has been previously encoded based on an error correction code (ECC). The system stores, on a physical media of the storage device, the obtained file as a read-only replica. In response to receiving a request to read the file, the system decodes, by the storage device based on the ECC, the replica to obtain ECC-decoded data, wherein the ECC-decoded data is subsequently decompressed by a computing device associated with the storage device and returned as the requested file.

In some embodiments, the request to read the file is received from a requesting entity based on a first protocol. Subsequent to the computing device decompressing the ECC-decoded data, the system returns, to the requesting entity, the decompressed data as the requested file without performing any ECC encoding.

In some embodiments, decompressing the ECC-decoded data is performed by parallel decompression engines of the computing device.

In some embodiments, the request to read the file is received by the computing device and transmitted by the computing device to the storage device via a system which comprises at least one of each of: a first Ethernet switch and a second Ethernet switch; a first smart network interface card (NIC) and a second smart network interface card (NIC); and a plurality of Peripheral Interconnect Express (PCIe) switches, wherein the first smart NIC and the second smart NIC each comprise a simple storage node. The simple storage node includes: an uplink to the first Ethernet switch and the second Ethernet switch; and a downlink to the plurality of PCIe switches via a plurality of PCIe lanes which are used to connect to the storage device and a plurality of other storage devices.

In some embodiments, the request to read the file is further received by a second computing device which is a backup or a high-availability server for the computing device and is further transmitted by the second computing device to the storage device via the system.

In some embodiments, the system stores, by the computing device, a mapping of a name of the file to a current physical block address associated with the storage device.

In some embodiments, in response to detecting a condition to move the file from the current physical block address to a new physical block address associated with the storage device, the system updates the mapping of the name of the file to the new physical block address.

In some embodiments, a format for the file stored in the storage device includes one or more: a pre-amble which denotes a starting location associated with the file; a unique file identifier for the file; a content of the file; a post-amble which denotes an ending location associated with the file; and a cyclic redundancy check (CRC) signature for verification of consistency of the content of the file.

In some embodiments, the first storage device does not comprise: a module or unit which performs ECC-encoding; a dynamic random access memory (DRAM) interface and DRAM modules accessed via the DRAM interface; and a processor which performs flash translation layer (FTL) functionality, including mapping a logical block address to a physical block address.

Another embodiment provides a distributed storage system for facilitating one or more big data analysis applications through one or more clients. The distributed storage system comprises a front-end server, switch, and a plurality of NAND cards coupled to the switch. The front-end head server is configured to receive the request to read the file. The NAND card is configured to: receive, via the switch, a request to read a file stored on the NAND card; and decode, by the NAND card based on an error correction code (ECC), the file to obtain ECC-decoded data. The front-end head server is configured to decompress the ECC-decoded data and return the decompressed data as the requested file.

In some embodiments, the NAND card is further configured to obtain the file from an original physical media separate from the NAND card, wherein the file comprises compressed data which has been previously encoded based on the error correction code (ECC). The NAND card is further configured to return the ECC-decoded data to the front-end head server without performing any ECC encoding. The NAND card does not comprise: a module or unit which performs ECC-encoding; a dynamic random access memory (DRAM) interface and DRAM modules accessed via the DRAM interface; and a processor which performs flash translation layer (FTL) functionality, including mapping a logical block address to a physical block address. This facilitates the big data analysis applications to efficiently analyze data by performing a reduced amount of ECC encoding.

BRIEF DESCRIPTION OF THE FIGURES

In the figures, like reference numerals refer to the same figure elements.

DETAILED DESCRIPTION

Figure 1:
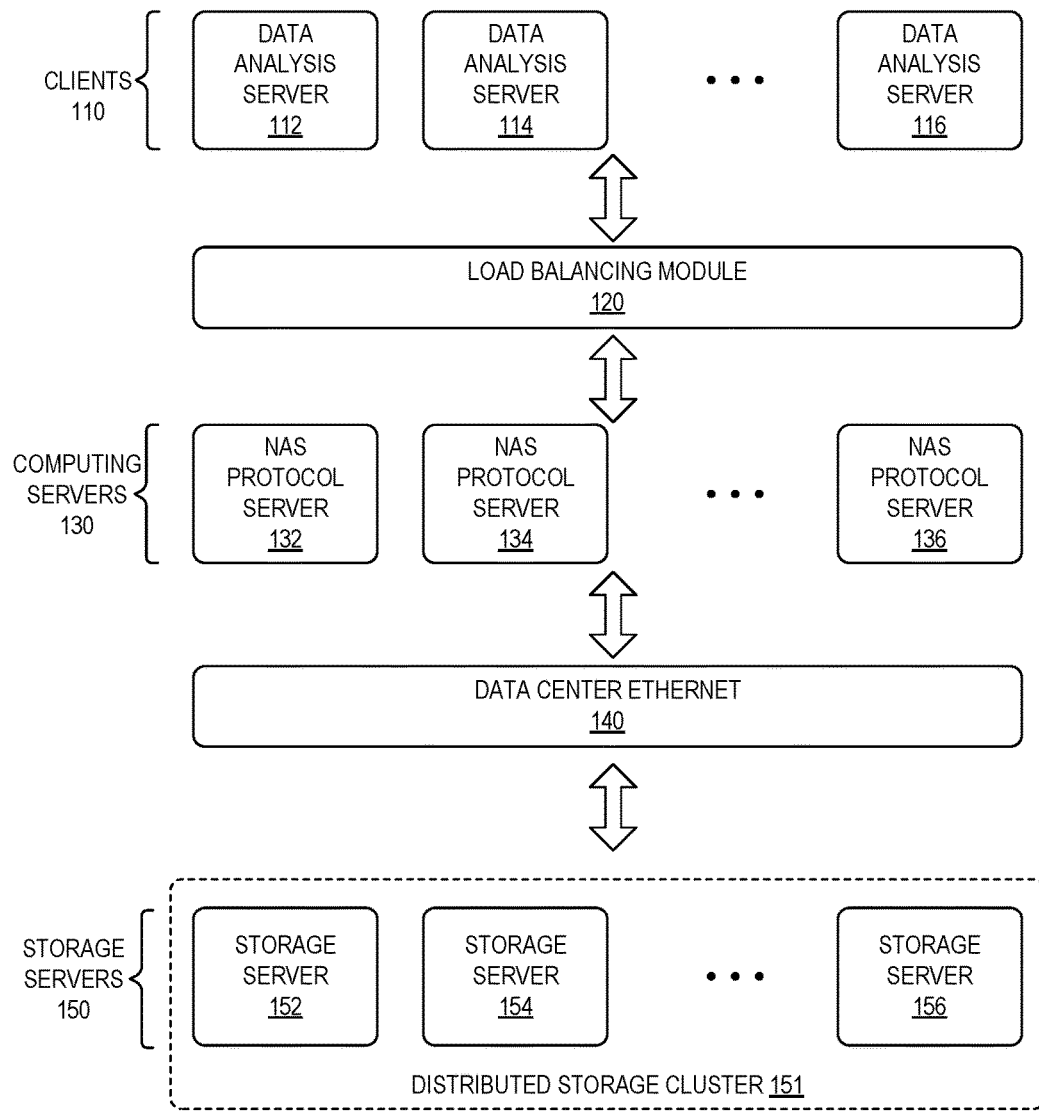
FIG. 1 illustrates an exemplary environment for facilitating data access in a storage device, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the inefficiencies of big data analysis in current distributed storage systems by providing a novel distributed storage system with simplified "NAND cards" as storage devices. These storage devices offload the ECC-encoding to an original storage device, eliminate a DRAM controller and modules in the storage device, and offload FTL functionality to a computing device at the front of the system.

As described above, big data analysis is an example of a read-intensive scenario which requires reading a very large amount of data frequently, but leaving the source data unchanged. To accelerate the data analysis processing performed by multiple data analysis servers, the intermediate results are generally stored in a memory-style medium. However, this may result in a considerable overhead in transferring a large amount of data through the Ethernet over a long distance. To avoid this overhead, the read source is generally replicated to form a local copy at each site. As a result, both a low cost and a high throughput are practical and essential requirements for storage of source data replicas.

In current big data analysis, conventional distributed storage systems can be used to provide the required storage for the multiple stored replicas of the original data source, e.g., as required and accessed by multiple data analysis servers. However, the use of conventional distributed storage systems can result in several challenges and inefficiencies, including: a costly deployment of an entire distributed storage system consisting of tens of computing servers and storage servers, including networking; expensive rack space in a data center; a high power cost; and a high latency to access replicas stored in the storage servers (as described below in relation to FIG. 1). As big data analysis continues to grow, the inefficiencies and challenges of conventional distributed storage systems will also continue to grow.

The embodiments described herein address these challenges and inefficiencies by providing a distributed storage system which has both high-capacity storage and a high throughput. The system allows multiple data analysis servers to access data with low latency and low cost. The system includes a front-end head server coupled to an Ethernet switch, which is coupled to a smart network interface card (NIC) System on Chip (SOC). The smart NIC SOC is coupled to a plurality of Peripheral Interconnect Express (PCIe) switches (via multiple PCIe lanes), where each PCIe switch is coupled to a plurality of "NAND cards." Each NAND card can be a simplified storage device that includes an ECC decoder, but does not include certain modules, such as: an ECC encoder; FTL operations or functionality via processors; and a DRAM interface/storage.

Instead, the functionality performed by these modules can be offloaded in various ways. For example, ECC encoding can be performed by an original data source storage device, and the ECC-encoded data (which also comprises error-free data because it has been previously ECC-decoded) can be retrieved from the original data source storage device on an outbound data I/O path, or fed to the NAND card, as depicted in relation to FIG. 3. Furthermore, the FTL-related operations of mapping and maintaining the mapping of LBAs to PBAs can be offloaded to a computing device which serves as a front-end head of a distributed storage system, e.g., by handling requests from data analysis servers, such as requests to access files stored as read-source data or replicas. In addition, the NAND card can use a simple buffer or cache for any necessary ECC decoding, which allows the DRAM interface and the DRAM to be removed from the storage device.

Thus, by simplifying the NAND card in the manner described here, the embodiments of the system can result in a savings in both cost and power, and can also result in a more efficient distributed storage system which can provide the low cost and high throughput required to serve the data access requests from multiple data analysis servers, for big data analysis and other similar applications which require frequent access of read-only data.

A "storage drive" refers to a device or a drive with a non-volatile memory which can provide persistent storage of data, e.g., a solid state drive (SSD) or a hard disk drive (HDD).

A "storage server" refers to a computing device which can include multiple storage drives. A distributed storage system can include multiple storage servers.

NAND flash memory can store a certain number of bits per cell. For example: a "single-level cell" or "SLC" memory element can store one bit of information per cell; a "multi-level cell" or "MLC" memory element can store two bits of information per cell; a "triple-level cell" or "TLC" memory element can store three bits of information per cell; and a "quad-level cell" or "QLC" memory element can store four bits of information per cell.

A "NAND card" refers to a storage device with a simplified architecture, e.g., with no processor for FTL functionality, ECC encoder module, or DRAM interface/DRAM, as discussed below in relation to FIGS. 2 and 4.

Exemplary Environment for Data Access in the Prior Art

FIG. 1 illustrates an exemplary environment for facilitating data access in a storage device, in accordance with the prior art. In this conventional environment 100, a network-attached storage (NAS) protocol can be implemented through NAS protocol servers, and data can be stored in a distributed storage cluster. For example: clients 110 can include data analysis servers 112, 114, and 116; computing servers 130 can include network-attached storage (NAS) protocol servers 132, 134, and 136; and storage servers 150 can comprise a distributed storage cluster 151 and can include storage servers 152, 154, and 156. In environment 100, data can pass from data analysis servers 112-116, via a load balancing module 120, to NAS protocol servers 132-136. Data can then pass through a data center Ethernet 140 to be stored at or on storage servers 152-156.

One advantage to the conventional distributed storage system of environment 100 is its ability to provide sufficient capacity to accommodate the ever growing large amounts of data required to be accessed by data analysis servers, i.e., as the site of the replica of the data source. However, there exist several disadvantages or drawbacks to this conventional system. First, the entire distributed storage system requires a large number of computing servers and storage servers, such as on the order of tens, along with the necessary networking, which can be cumbersome to maintain and scale. The networking costs associated with various border gateway protocols (BGPs) can be significant. Second, the rack space in a data center can be expensive, and the rack space costs will necessarily increase in order to scale such a conventional distributed storage system. Third, the cost of the power required to store, access, and maintain this replica data in multiple locations is high, and the power costs may also increase when maintaining or scaling. Fourth, the latency involved in reading or accessing data from such a replica site may be significantly high or long. Thus, given the high cost of the data center rack space and the power budget, and the need to improve the throughput of the replica data source, as well as the high cost of relying on a conventional distributed storage system for frequent access of read-only data in this manner, these disadvantages can result in a more inefficient system in terms of cost, performance, and scalability.

Figure 2:
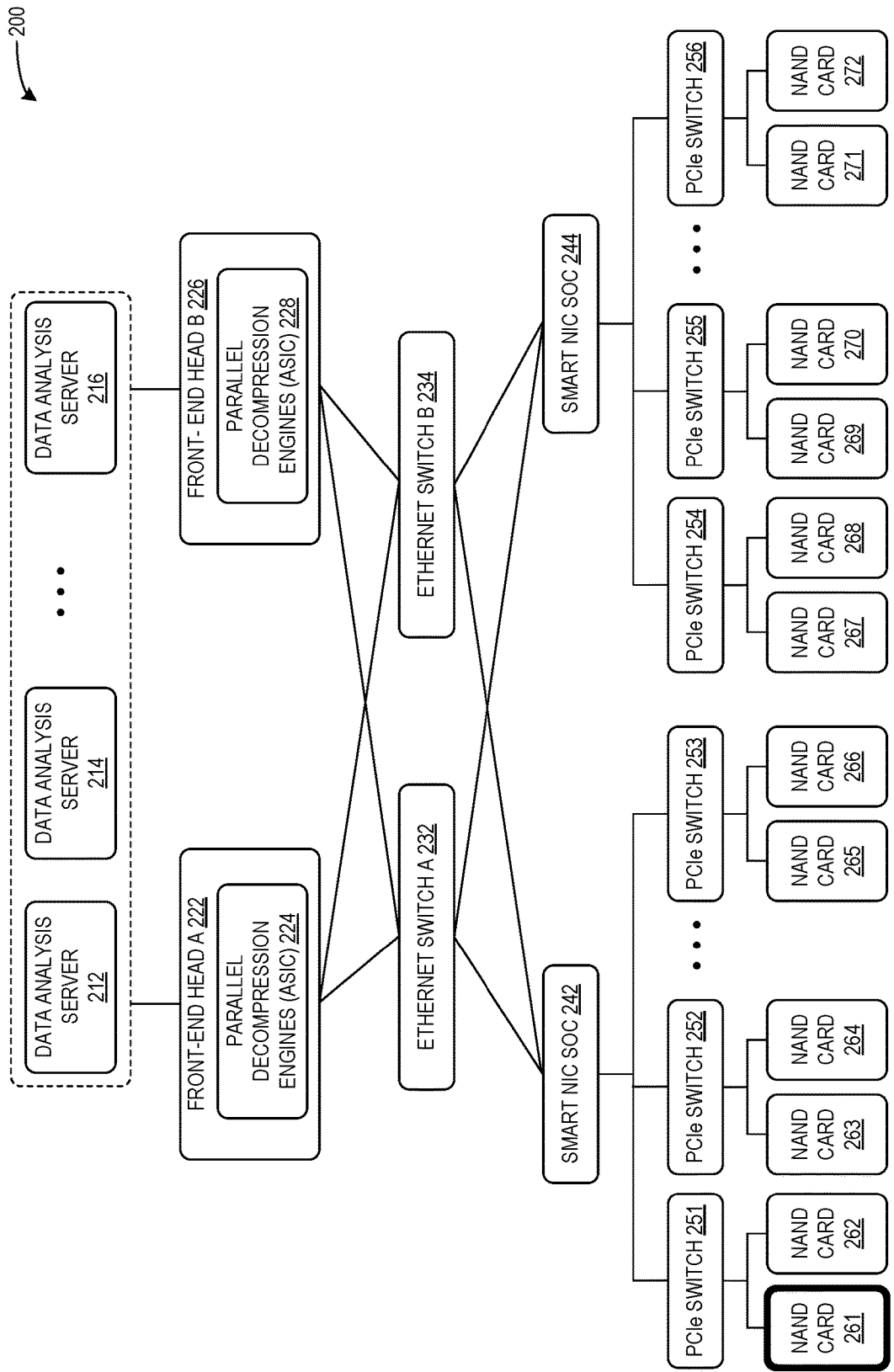
FIG. 2 illustrates an exemplary environment for facilitating data access in a storage device, in accordance with an embodiment of the present application.

Exemplary Environment for Facilitating Data Access Using a Simplified "NAND Card" Storage Device FIG. 2 illustrates an exemplary environment 200 for facilitating data access in a storage device, in accordance with an embodiment of the present application. Environment 200 can depict a distributed storage system, and can include several entities, including a pair of front-end heads, a pair of Ethernet switches, a pair of smart NIC System on Chips (SOCs), a plurality of PCIe switches, and a plurality of "NAND cards." As discussed above, the term "NAND card" refers to a storage device with a simplified architecture, e.g., with no processor, ECC encoder module, or DRAM interface/DRAM, as discussed below in relation to FIG. 4. In a pair of entities, one entity can be a main (or active) entity, while the other entity can be a backup (or non-active entity) which provides high availability in the event that the main entity malfunctions or is otherwise non-responsive.

For example, environment 200 can include: a front-end head A 222 with parallel decompression engines (ASIC) 224; and a front-end head B 226 with parallel decompression engines (ASIC) 228. Each front-end head can be configured to handle a specific protocol, e.g., a network attached storage (NAS) protocol to handle incoming requests from multiple big data analysis servers. Each front-end head can be viewed as a simplified client node with either no storage drive or a very limited capacity. Each front-end head is thus responsible for handling incoming requests via a certain protocol, and for decompressing data based on its respective parallel decompression engines.

Each front-end head can be coupled to an Ethernet switch A 232 and an Ethernet switch B 234. Each Ethernet switch can be coupled to a smart NIC SOC 242 and a smart NIC SOC 244. Each smart NIC SOC can be coupled to a plurality of PCIe switches (via a plurality of PCIe lanes), and each smart NIC SOC can further determine which PCIe lane to use. Each smart NIC SOC can serve as a simple storage node, and can have a simplified microprocessor, such as a Microprocessor without Interlocked Pipelined Stages (MIPS) or an Advanced RISC Machine (ARM) processor. Smart NIC SOC 242 can be coupled to PCIe switches 251, 252, and 253, while smart NIC SOC 244 can be coupled to PCIe switches 254, 255, and 256. That is, each smart NIC SOC has an uplink which connects via Ethernet to at least one Ethernet Switch, and each smart NIC SOC also has a downlink which includes a PCIe lane which is used to connect to a PCIe NAND card.

Each PCIe switch can be coupled to a plurality of NAND cards, and these NAND cards can provide the storage capacity and high-throughput required for frequent data access, e.g., for big data analysis by data analysis servers 212, 214, and 216. An exemplary NAND card (such as NAND card 261) is described below in relation to FIG. 4. In order to increase the capacity of the system depicted in environment 200, the system can add more entities at any depicted level, including more Ethernet switches, more smart NIC SOCs, more PCIe switches, and more NAND cards.

Thus, in the embodiments described herein, the system provides a distributed storage system with both high-capacity storage and high-throughput by using a plurality of NAND cards in an environment such as environment 200. By placing only the protocol-handling and compression functionality in the front-end head, the distributed storage system allows the NAND cards to serve only as the data pool, which allows the overall distributed storage system to be easily moved/built, e.g., in a small data center, occupying or using less overall rack space, and resulting in a lower total cost of operation (TCO).

Exemplary Data I/O Path for Data Access

Figure 3:
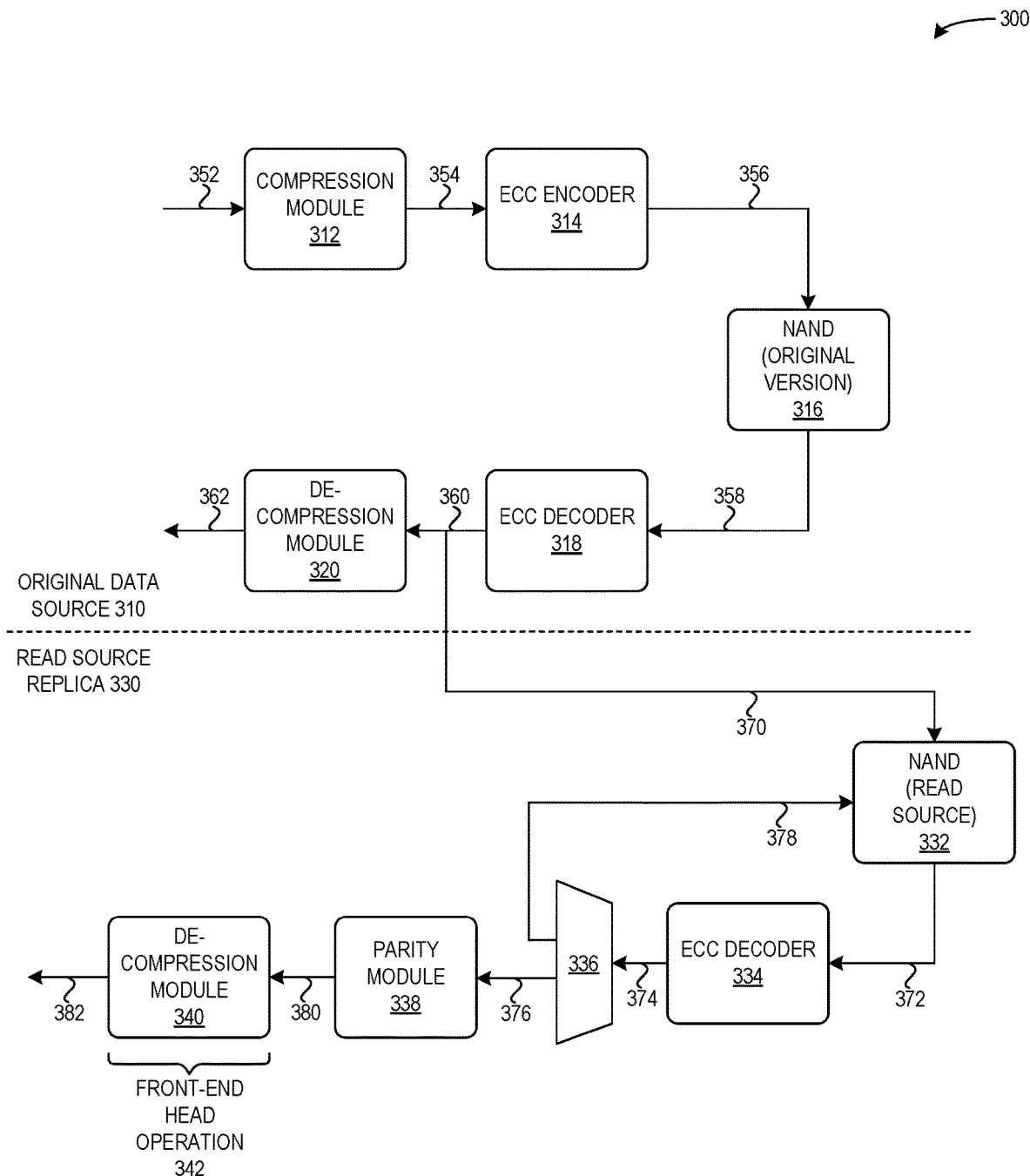
FIG. 3 illustrates an exemplary environment for data placement in an original data source and a copy out to a read source replica, including a data I/O path, in accordance with an embodiment of the present application.

FIG. 3 illustrates an exemplary environment 300 for data placement in an original data source 310 and a copy out to a read source replica 330, including a data I/O path, in accordance with an embodiment of the present application. Original data can be stored at an original data source 310 via a data I/O path that includes: receiving the data to be stored (via a communication 352); receiving and compressing, by a compression module 312, the received data; sending the compressed data to an ECC encoder module 314 (via a communication 354); receiving and compressing, by ECC encoder module 314, the compressed data; sending the ECC-encoded data to be stored in a NAND 316 (via a communication 356) ("originally stored data" or "original version"). This originally stored data in NAND 316 can be accessed or read upon receiving a request to read the data, via a data I/O path that includes: receiving, by an ECC decoder module 318, the ECC-encoded data (via a communication 358); decoding, by ECC decoder module 318, the ECC-encoded data; sending the ECC-decoded data to a decompression module 320; receiving and decompressing, by decompression module 320, the ECC-decoded data; and returning the decompressed data (via a communication 362).

During the data I/O path of accessing the data, subsequent to the data being decoded by ECC-decoder 318, the originally stored data has been successfully ECC-decoded, as "error-free data," and ECC decoder 318 is also in possession of the entire ECC codeword including ECC parity bits, as obtained from NAND 316. At this point, read source replica 330 can obtain or retrieve (or original source 310 can transmit or send) the error-free data of the full ECC codeword (including ECC parity bits) from ECC decoder module 318 (via a communication 370). Read source replica 330 can store the obtained ECC codeword in NAND 332 (as the read source or as a read-only replica).

When the data is requested to be accessed (e.g., by a data analysis server, as in FIG. 2), the stored read-only replica (i.e., the ECC codeword) is retrieved from NAND 332 and sent to an ECC decoder 334 (via a communication 372). ECC decoder 334 can receive and decode the ECC codeword, and send the ECC-decoded data to a module such as a multiplexer 336 (via a communication 374). Multiplexer 336 can determine whether the data must be refreshed, needs to be moved, or has been recently moved to a new physical location. If the data needs to be refreshed or moved, the system can send the data back to NAND 332 (via a communication 378). If the system does not need to be refreshed or moved, the system can send the data onwards to a parity module 338 (via a communication 376). Parity module 338 can drop the ECC parity bits to obtain compressed data. Parity module 338 can send the compressed data to a front-end head for decompression (via a communication 380). A decompression module 340 can receive and perform decompression on the compressed data (as a front-end operation 342), to obtain the data requested to be accessed or read, and can send back the requested data (via a communication 382).

Thus, in the embodiments described herein, the system provides a high-density, high-capacity data source for high-intensity, frequent read accesses from multiple data analysis servers. By using these "simplified" NAND cards, the system can result in a reduced TCO and can eliminate the need for tens or hundreds of servers as in the conventional distributed storage system.

Exemplary Storage Device (NAND Card) for Data Access

Figure 4:
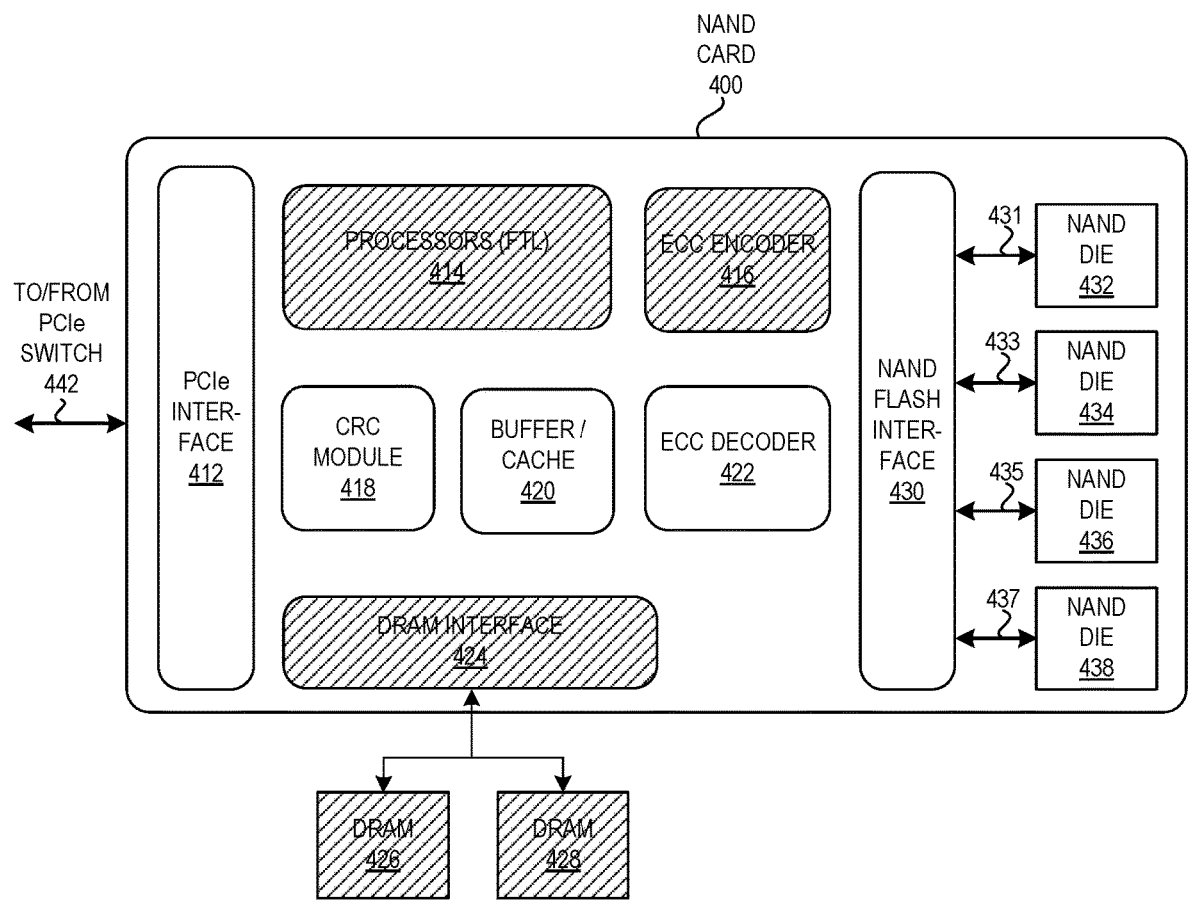
FIG. 4 illustrates an exemplary diagram of a storage device, including a NAND card with a simplified architecture, in accordance with an embodiment of the present application.

FIG. 4 illustrates an exemplary diagram of a storage device, including a NAND card 400 with a simplified architecture, in accordance with an embodiment of the present application. NAND card 400 can correspond to any of NAND cards 261-272 depicted in relation to FIG. 2, such as NAND card 261. NAND card 400 can include: a PCIe interface 412 for communication between NAND card 400 and a PCIe switch (via a communication 442); a CRC module 418 for providing verification of data consistency based on a CRC signature; a buffer/cache 420 for holding data; an ECC decoder 422 for performing ECC decoding; and a NAND flash interface 430 for communication between the NAND card and physical storage media associated with NAND card 400. For example, NAND card 400 can include a plurality of channels via which data can be passed or communicated through NAND flash interface 430, including: NAND die 432 (accessed via a channel 431); NAND die 434 (accessed via a channel 433); NAND die 436 (accessed via a channel 435); and NAND die 438 (accessed via a channel 437).

NAND card 400 does not include some modules or components which were previously included in a conventional SSD or a conventional storage device. These modules or components are indicated by right-slanting lanes. NAND card 400 does not include: processors (FTL) 414; an ECC encoder 416; and a DRAM interface 424 with associated DRAMs 426 and 428.

Note that NAND flash storage is depicted as the exemplary non-volatile memory storage in this disclosure, as NAND flash may provide a higher reliability and performance in read/write operations as compared to other types of non-volatile memory storage. However, in some embodiments, any type of memory storage can be used, including but not limited to a hard disk drive, phase change memory, and other non-volatile memory storage.

Exemplary Mapping of Files to Physical Block Addresses; Exemplary File Format In a conventional file system of a distributed storage system, a mapping is typically maintained between logical block addresses (LBAs) and physical block addresses (PBAs). In such conventional systems, the LBA is used to execute random writes or updates. In contrast, in the embodiments described herein, in the file system coordinated by the front-end head (e.g., front-end head A 222 of FIG. 2), the front-end head receives requests to read data in the granularity of files, not blocks or pages, thus eliminating the need to maintain the more granular LBA to PBA mapping. In the embodiments described herein, while there may be no incoming write requirements, some data may need to be periodically refreshed or moved. But because the data is based on the more coarse granularity of a file, the system can map file names to PBAs and also use a log structure in a single block by appending new data to the end of the block.

Figure 5:
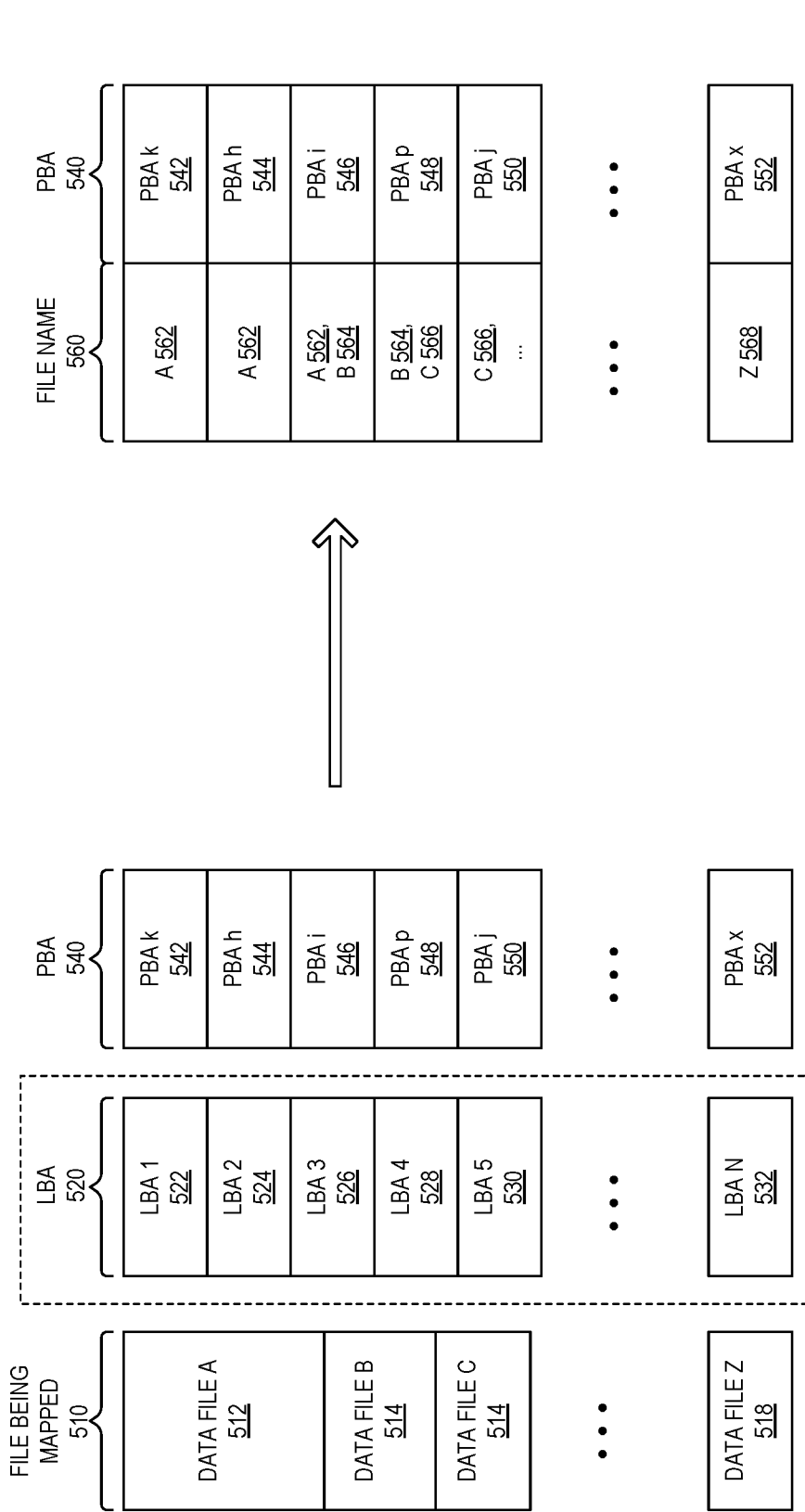
FIG. 5 illustrates an exemplary mapping of files to physical block addresses, in accordance with an embodiment of the present application.

FIG. 5 illustrates an exemplary mapping of files to physical block addresses, in accordance with an embodiment of the present application. A file being mapped 510 can correspond to logical block addresses 520 and physical block addresses 540. The logical size can be the same as the physical block size. In the embodiments described herein, the system can offload the conventional FTL functionality (of mapping LBAs to PBAs) from a processor inside a storage device controller (e.g., an SSD controller) to a computing device associated with the storage device (e.g., a front-end head computing device). The front-end head computing device (or other computing device or entity other than the storage device controller) can store a mapping of a file name 560 to a PBA 540.

For example, a data file A 512 can correspond to multiple LBAs, which each correspond to a PBA. The front-end head computing device can store a mapping of a file name of data file A 512 (e.g., "A") to one or more PBAs associated with LBAs corresponding to data file A 512. For example, data file A 512 (with file name "A") can be associated with an LBA 1 522, an LBA 2 524, and an LBA 3 526, which each correspond, respectively, to a PBA k 542, a PBA h 544, and a PBA i 546. The front-end head (or other computing device separate from the storage device controller) can store a mapping of the file name "A" 562 to PBA k 542, PBA h 544, and PBA i 546. Note that a file name can be mapped to multiple PBAs, just as a single PBA may be mapped to multiple file names (e.g., both file name "A" 562 and file name "B" 564 are mapped to PBA i 546). The system can determine the exact location within a certain PBA from which to read a requested file, as described below in relation to FIG. 6.

Figure 6:
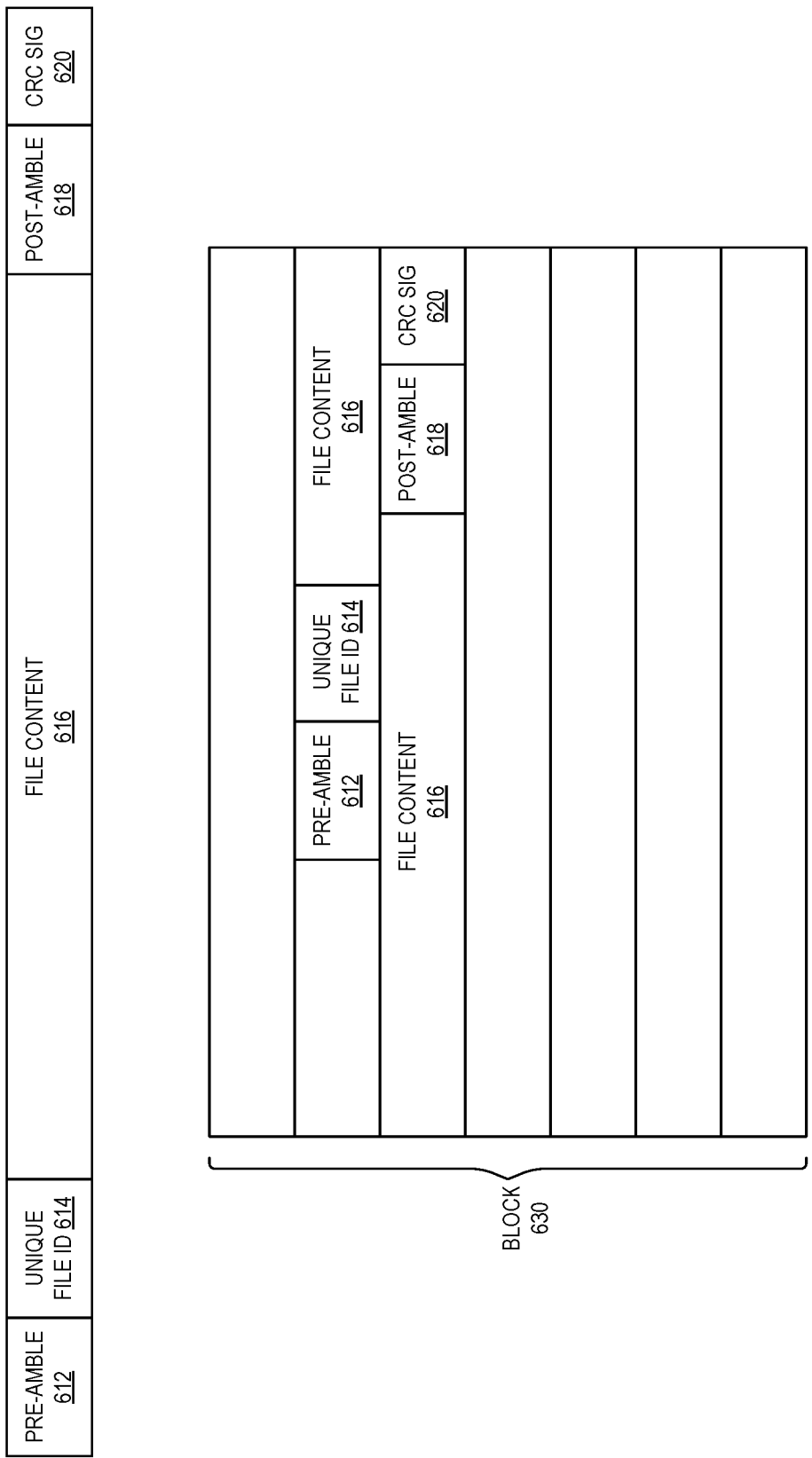
FIG. 6 illustrates an exemplary diagram of a file format and a NAND block layout, in accordance with an embodiment of the present application.

FIG. 6 illustrates an exemplary diagram 600 of a file format and a NAND block layout, in accordance with an embodiment of the present application. Diagram 600 can include a file format corresponding to a file which is written to a non-volatile memory such as a NAND. The file format can include: a pre-amble 612 which denotes a start of a given file; a unique file identifier 614, which identifies the given file and does not collide with any other file identifier; file content 616 corresponding to the given file; a post-amble 618 which denotes an end of the given file; and a cyclic redundancy check (CRC) signature 620 which provides verification for the consistency of the content of the given file. Block 630 depicts how a formatted file can be stored in block 630.

During operation, when the file name to PBA mapping indicates that a requested file is stored at a certain PBA, the system can read out the pages at the certain PBA to determine the starting point (e.g., indicated by pre-amble 612) of the requested file. Once the starting point has been determined, the system can check if unique file identifier 614 corresponds to the requested file. If so, the system can proceed to read the physical blocks one at a time until the system determines the ending point (e.g., post-amble 618) of the requested file. In block 630, the exemplary requested file includes file content 616 which is stored in only block 630. File content for a requested file can also be stored across multiple blocks. Upon determining the ending point of the requested file, the system can verify the consistency of the data based on checking the CRC signature 620.

Exemplary Method for Facilitating Data Access

Figure 7A:
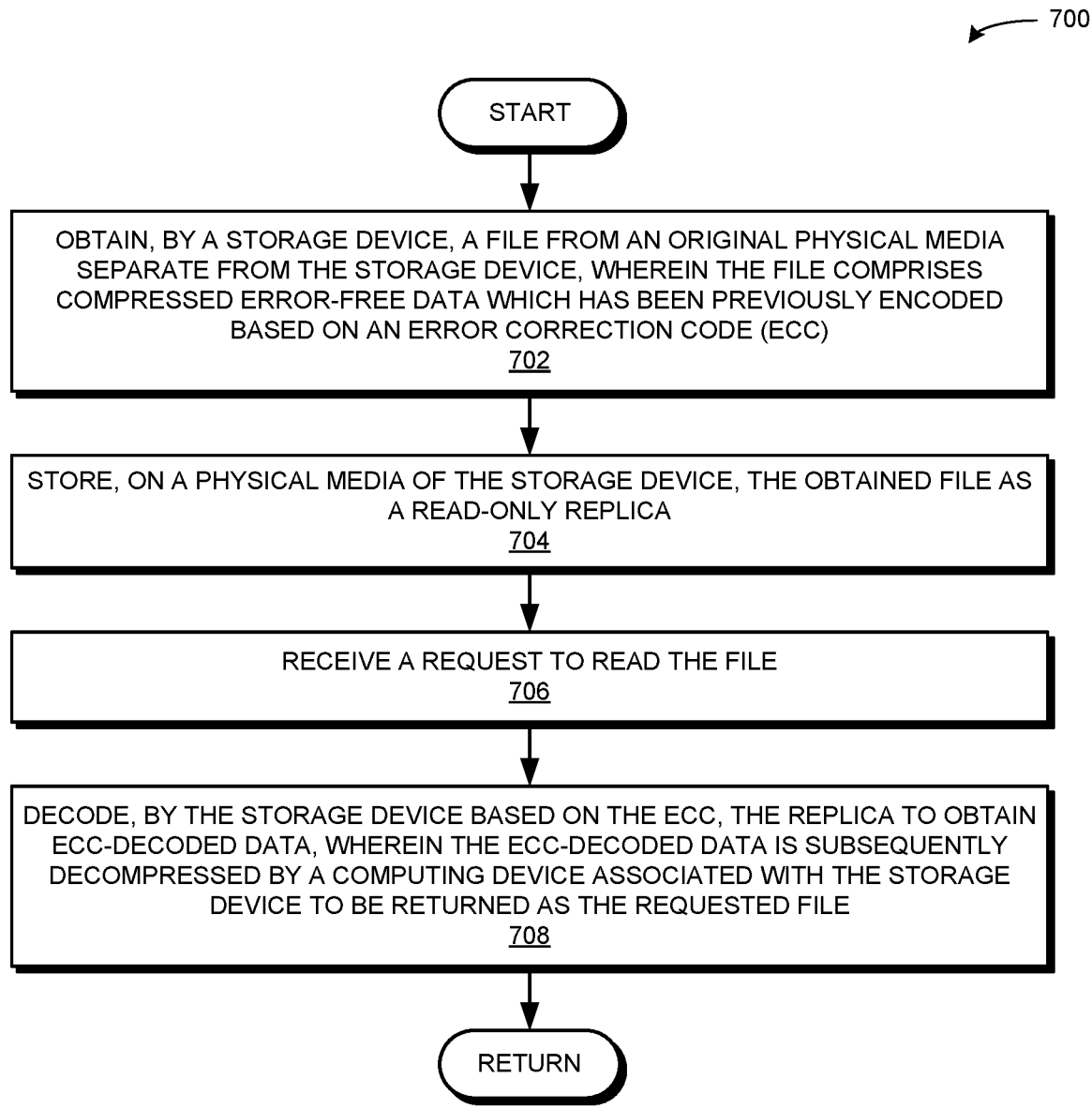
FIG. 7A presents a flowchart illustrating a method for facilitating data access in a storage device, in accordance with an embodiment of the present application.

FIG. 7A presents a flowchart 700 illustrating a method for facilitating data access in a storage device, in accordance with an embodiment of the present application. During operation, the system obtains, by a storage device, a file from an original physical media separate from the storage device, wherein the file comprises compressed error-free data which has been previously encoded based on an error correction code (ECC) (operation 702). The system stores, on a physical media of the storage device, the obtained file as a read-only replica (operation 704). The system receives a request to read the file (operation 706). In response to receiving the request to read the file, the system decodes, by the storage device based on the ECC, the replica to obtain ECC-decoded data, wherein the ECC-decoded data is subsequently decompressed by a computing device associated with the storage device to be returned as the requested file (operation 708), and the operation returns.

Figure 7B:
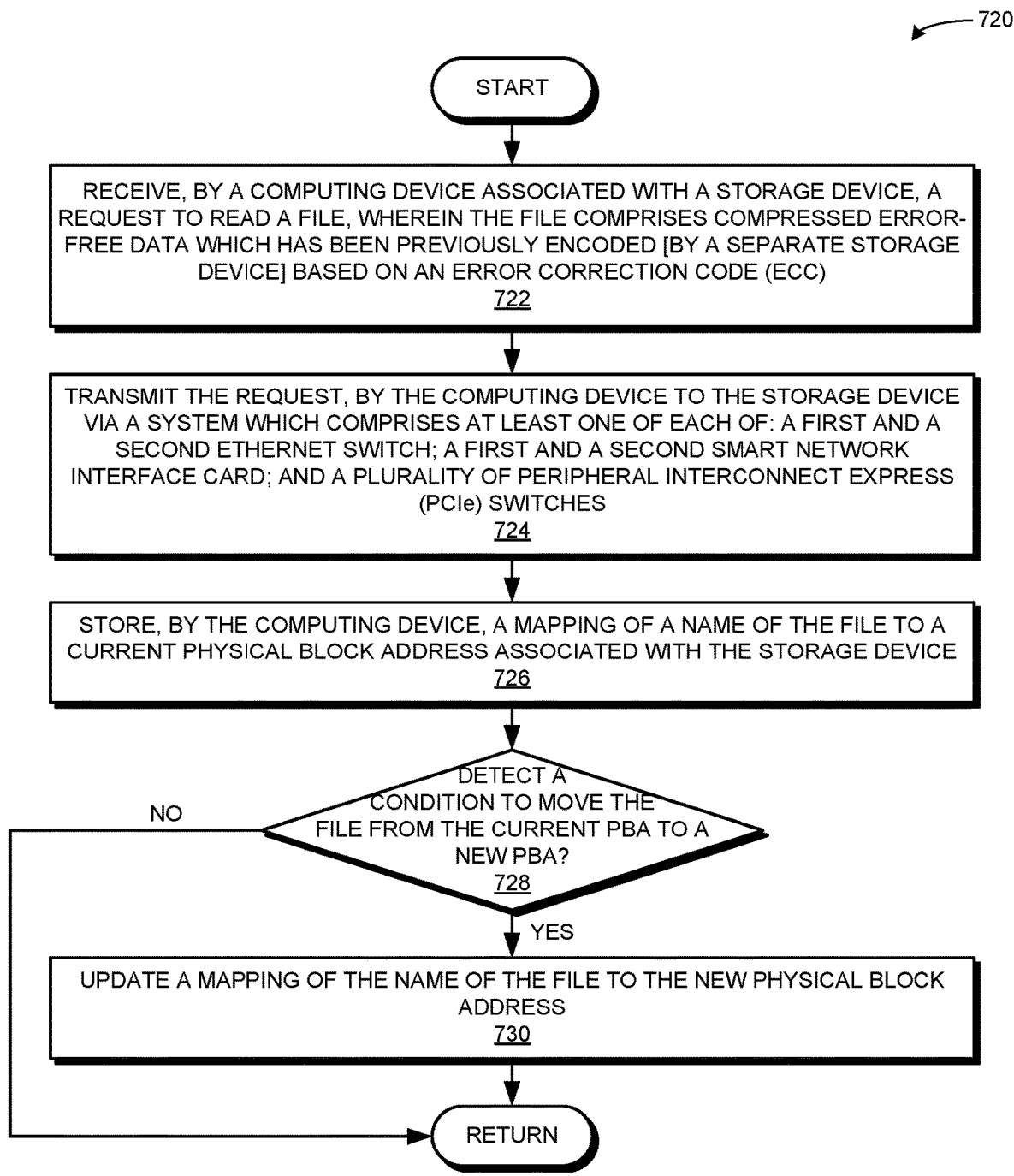
FIG. 7B presents a flowchart illustrating a method for facilitating data access in a storage device, in accordance with an embodiment of the present application.

FIG. 7B presents a flowchart 720 illustrating a method for facilitating data access in a storage device, in accordance with an embodiment of the present application. During operation, the system receives, by a computing device associated with a storage device, a request to read a file, wherein the file comprises compressed error-free data which has been previously encoded based on an error correction code (ECC) (operation 722). The previous ECC encoding can be performed by a separate storage device, such as depicted above in relation to ECC encoder 314 of FIG. 3. The system transmits the request, by the computing device to the storage device via a system which comprises at least one of each of: a first and a second Ethernet switch; a first and a second smart network interface card (NIC); and a plurality of Peripheral Interconnect Express (PCIe) switches (operation 724). The system stores, by the computing device, a mapping of a name of the file to a current physical block address (PBA) associated with the storage device (operation 726). If the system detects a condition to move the file from the current PBA to a new PBA (decision 728), the system updates a mapping of the name of the file to the new physical block address (operation 730). If the system does not detect a condition to move the file from the current PBA to a new PBA (decision 728), the operation returns.

Exemplary Computer System and Apparatus

Figure 8:
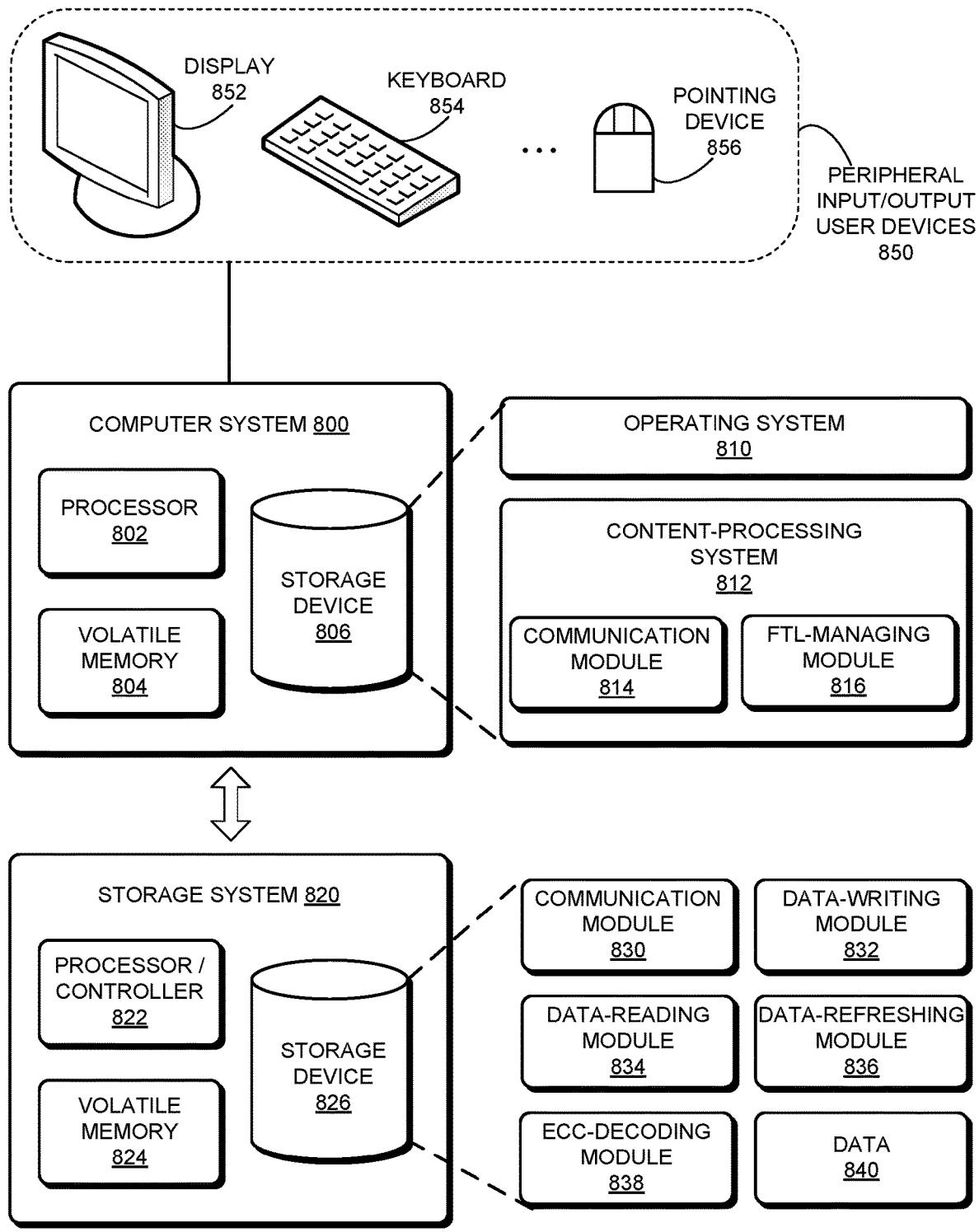
FIG. 8 illustrates an exemplary computer system and a storage system that facilitates data access in a storage device, in accordance with an embodiment of the present application.

FIG. 8 illustrates an exemplary computer system 800 and a storage system 820 that facilitates data access in a storage device, in accordance with an embodiment of the present application. Computer system 800 includes a processor 802, a volatile memory 804, and a storage device 806. Computer system 800 can correspond to front-end head 222 of FIG. 2. Processor 802 can include parallel decompression engines (e.g., in ASIC). Volatile memory 806 can include, e.g., random access memory (RAM), that serves as a managed memory, and can be used to store one or more memory pools. Storage device 806 can include persistent storage. Furthermore, computer system 800 can be coupled to peripheral input/output (I/O) user devices 850, e.g., a display device 852, a keyboard 854, and a pointing device 856. Storage device 806 can store an operating system 810, a content-processing system 812, and data (not shown).

Content-processing system 812 can include instructions, which when executed by computer system 800, can cause computer system 800 to perform methods and/or processes described in this disclosure. Specifically, content-processing system 812 can include instructions for receiving and transmitting data packets, including data to be read or written, an input/output (I/O) request (e.g., a read request or a write request), and data associated with a read request, a write request, or an I/O request (communication module 814). Content-processing system 812 can also include instructions for mapping, maintaining, and managing file names and/or LBAs to PBAs (FTL-managing module 816), such as storing a mapping of a name of a file to a current PBA associated with the storage device Computer system 800 can communicate via a distributed storage system with a storage system 820, which can include: a processor/controller 822; a volatile memory 824; and a storage device 826. Storage system 820 can correspond to a storage server, and storage device 826 can correspond to NAND card 261 of FIG. 2. Processor/controller 822 or storage device 826 can include instructions for obtaining a file from an original physical media separate from storage system 820 (communication module 830). Processor/controller 822 or storage device 826 can include instructions for storing, on a physical media of the storage device, the obtained file as a read-only replica (data-writing module 832). Processor/controller 822 or storage device 826 can include instructions for decoding, by the storage device based on the ECC, the replica to obtain ECC-decoded data (ECC-decoding module 838). Processor/controller 822 or storage device 826 can include instructions for, in response to detecting a condition to move a file (data-refreshing module 836), updating the mapping of the name of the file to the new physical block address (data-refreshing module 836).

Data 840 can include any data that is required as input or generated as output by the methods and/or processes described in this disclosure. Specifically, data 840 can store at least: data; a request; a read request; a write request; an input/output (I/O) request; data associated with a read request, a write request, or an I/O request; an error correction code (ECC); a codeword; parity bits; ECC parity bits; encoded data; ECC-encoded/decoded data; compressed data; decompressed data; error-free data; read-only data; a replica; a file; a file format; an indicator of an Ethernet switch, a NIC, a PCIe switch or lane, an uplink, or a downlink; a file name; a pre-amble; a file identifier; file content; a post-amble; a CRC signature; verifying information; an LBA; a PBA; an indicator of an original data source; and an indicator of a condition to move or refresh data.

Figure 9:
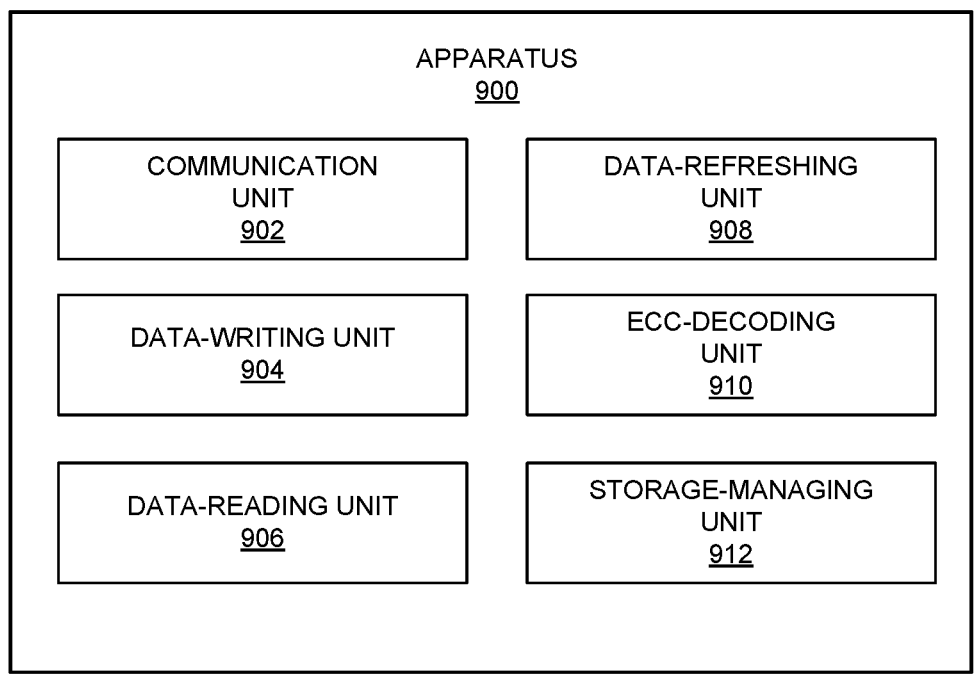
FIG. 9 illustrates an exemplary apparatus that facilitates data access in a storage device, in accordance with an embodiment of the present application.

FIG. 9 illustrates an exemplary apparatus 900 that facilitates data access in a storage device, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device which is capable of communicating with other computer systems and/or devices. Specifically, apparatus 900 can comprise units 902-912 which perform functions or operations similar to modules 830-836 of storage system 800 of FIG. 8, including: a communication unit 902; a data-writing unit 904; a data-reading unit 906; a data-refreshing unit 908; an ECC-decoding unit 910; and a storage-managing unit 912 (which can handle detecting a condition to refresh the data and move a file from a current PBA to a new PBA).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data access in a storage device, the method comprising:
   obtaining, by a storage device, a file from an original physical media separate from the storage device, wherein the file comprises compressed data which has been previously encoded based on an error correction code;
   storing, on a physical media of the storage device, the obtained file as a read-only replica;
   receiving, by the storage device, a request to read the file stored on the physical media of the storage device; and
   decoding, by the storage device based on the error correction code (ECC), the file to obtain ECC-decoded data,
   wherein the ECC-decoded data is subsequently decompressed by a computing device associated with the storage device and returned as the requested file.

2. The method of claim 1, wherein the request to read the file is received from a requesting entity based on a first protocol, and wherein subsequent to the computing device decompressing the ECC-decoded data, the method further comprises:
   returning, to the requesting entity, the decompressed data as the requested file without performing any ECC encoding.

3. The method of claim 1, wherein decompressing the ECC-decoded data is performed by parallel decompression engines of the computing device.

4. The method of claim 1, wherein the request to read the file is received by the computing device and transmitted by the computing device to the storage device via a system which comprises at least one of each of:
   a first Ethernet switch and a second Ethernet switch;
   a first smart network interface card (NIC) and a second smart network interface card (NIC); and
   a plurality of Peripheral Interconnect Express (PCIe) switches,
   wherein the first smart NIC and the second smart NIC each comprise a simple storage node which includes:
      an uplink to the first Ethernet switch and the second Ethernet switch; and
      a downlink to the plurality of PCIe switches via a plurality of PCIe lanes which are used to connect to the storage device and a plurality of other storage devices.

5. The method of claim 4, wherein the request to read the file is further received by a second computing device which is a backup or a high-availability server for the computing device and is further transmitted by the second computing device to the storage device via the system.

6. The method of claim 1, further comprising:
storing, by the computing device, a mapping of a name of the file to a current physical block address associated with the storage device; and
in response to detecting a condition to move the file from the current physical block address to a new physical block address associated with the storage device, updating the mapping of the name of the file to the new physical block address.

7. The method of claim 1, wherein a format for the file stored in the storage device includes one or more:
a pre-amble which denotes a starting location associated with the file;
a unique file identifier for the file;
a content of the file;
a post-amble which denotes an ending location associated with the file; and
a cyclic redundancy check (CRC) signature for verification of consistency of the content of the file.

8. The method of claim 1, wherein the storage device does not comprise:
a module or unit which performs ECC-encoding;
a dynamic random access memory (DRAM) interface and DRAM modules accessed via the DRAM interface; and
a processor which performs flash translation layer (FTL) functionality, including mapping a logical block address to a physical block address.

9. A computer system for facilitating data access in a system, the system comprising:
a processor; and
a memory coupled to the processor and storing instructions, which when executed by the processor cause the processor to perform a method, wherein the computer system comprises a storage device, the method comprising:
obtaining, by a storage device, a file from an original physical media separate from the storage device, wherein the file comprises compressed data which has been previously encoded based on an error correction code;
storing, a physical media of the storage device, the obtained file as a read-only replica;
receiving, by the storage device, a request to read the file stored on the physical media of the storage device; and
decoding, by the storage device based on the error correction code (ECC), the file to obtain ECC-decoded data,
wherein the ECC-decoded data is subsequently decompressed by a computing device associated with the storage device and returned as the requested file.

10. The computer system of claim 9, wherein the request to read the file is received from a requesting entity based on a first protocol, and wherein subsequent to the computing device decompressing the ECC-decoded data, the method further comprises:
returning, to the requesting entity, the decompressed data as the requested file without performing any ECC encoding.

11. The computer system of claim 9, wherein decompressing the ECC-decoded data is performed by parallel decompression engines of the computing device.

12. The computer system of claim 9, wherein the request to read the file is received by the computing device and transmitted by the computing device to the storage device via a system which comprises at least one of each of:
a first Ethernet switch and a second Ethernet switch;
a first smart network interface card (NIC) and a second smart network interface card (NIC); and
a plurality of Peripheral Interconnect Express (PCIe) switches,
wherein the first smart NIC and the second smart NIC each comprise a simple storage node which includes:
an uplink to the first Ethernet switch and the second Ethernet switch; and
a downlink to the plurality of PCIe switches via a plurality of PCIe lanes which are used to connect to the storage device and a plurality of other storage devices.

13. The computer system of claim 12, wherein the request to read the file is further received by a second computing device which is a backup or a high-availability server for the computing device and is further transmitted by the second computing device to the storage device via the system.

14. The computer system of claim 9, wherein the method further comprises:
storing, by the computing device, a mapping of a name of the file to a current physical block address associated with the storage device; and
in response to detecting a condition to move the file from the current physical block address to a new physical block address associated with the storage device, updating the mapping of the name of the file to the new physical block address.

15. The computer system of claim 9, wherein a format for the file stored in the storage device includes one or more:
a pre-amble which denotes a starting location associated with the file;
a unique file identifier for the file;
a content of the file;
a post-amble which denotes an ending location associated with the file; and
a cyclic redundancy check (CRC) signature for verification of consistency of the content of the file.

16. The computer system of claim 9, wherein the storage device does not comprise:
a module or unit which performs ECC-encoding;
a dynamic random access memory (DRAM) interface and DRAM modules accessed via the DRAM interface; and
a processor which performs flash translation layer (FTL) functionality, including mapping a logical block address to a physical block address.

17. A distributed storage system for facilitating one or more big data analysis applications through one or more clients, the distributed storage system comprising:
a front-end head server;
a switch; and
a plurality of NAND cards coupled to the switch,
wherein a NAND card is configured to:
obtain a file from an original physical media separate from the storage device, wherein the file comprises compressed data which has been previously encoded based on an error correction code;
store on a physical media of the NAND card, the obtained file as a read-only replica;
receive, via the switch, a request to read the file stored on the NAND card; and
decode, by the NAND card based on the error correction code (ECC), the file to obtain ECC-decoded data, and
wherein the front-end head server is configured to decompress the ECC-decoded data and return the decompressed data as the requested file.

18. The distributed storage system of claim 17,
wherein the front-end head server is configured to receive the request to read the file,
wherein the NAND card is further configured to:
  return the ECC-decoded data to the front-end head server without performing any ECC encoding; and
wherein the NAND card does not comprise:
  a module or unit which performs ECC-encoding;
  a dynamic random access memory (DRAM) interface and DRAM modules accessed via the DRAM interface; and
  a processor which performs flash translation layer (FTL) functionality, including mapping a logical block address to a physical block address,
  thereby facilitating the big data analysis applications to efficiently analyze data by performing a reduced amount of ECC encoding.

* * * * *